United States Patent [19]

Drent

[11] Patent Number: 4,810,774

[45] Date of Patent: Mar. 7, 1989

[54] CATALYTIC COPOLYMERIZATION OF CO/OLEFIN WITH KETONE ADDITIVE.

[75] Inventor: Eit Drent, Amsterdam, Netherlands

[73] Assignee: Shell Oil Company, Houston, Tex.

[21] Appl. No.: 61,615

[22] Filed: Jun. 15, 1987

[30] Foreign Application Priority Data

Jun. 24, 1986 [NL] Netherlands ............... 8601641

[51] Int. Cl.$^4$ ............................................. C08G 67/02
[52] U.S. Cl. ...................................... 528/392; 502/162
[58] Field of Search ........................................... 528/392

[56] References Cited

U.S. PATENT DOCUMENTS

| | | | |
|---|---|---|---|
| 2,495,286 | 1/1950 | Brubaker | 260/63 |
| 3,448,140 | 6/1969 | Gamlen | 260/471 |
| 3,689,460 | 9/1972 | Nozaki | 260/63 |
| 3,694,412 | 9/1972 | Nozaki | 260/63 |
| 3,835,123 | 9/1974 | Nozaki | 260/94.9 |
| 3,914,391 | 10/1975 | Nozaki | 423/364 |
| 4,076,911 | 2/1978 | Fenton | 526/11.1 |
| 4,474,978 | 10/1984 | Drent | 560/24 |
| 4,599,476 | 7/1986 | Drent | 585/511 |
| 4,634,793 | 1/1987 | Drent | 560/243 |

FOREIGN PATENT DOCUMENTS

| | | |
|---|---|---|
| 121965 | 8/1984 | European Pat. Off. |
| 181014 | 5/1986 | European Pat. Off. |
| 1081304 | 3/1965 | United Kingdom |

OTHER PUBLICATIONS

Kirk Othmer Encyclopedia of Chemical Technology, Second Edition, vol. 12, p. 132, 1967.
Advance Polym. Sci. 1986, 73–4, 125–44.

Primary Examiner—Harold D. Anderson

[57] ABSTRACT

The process of producing linear alternating polymers of carbon monoxide and at least one ethylenically unsaturated hydrocarbon in the presence of a novel catalyst composition prepared from a palladium compound, a non-transition metal salt of a non-hydrohalogenic acid having a pKa less than 6, bidentate phosphorus ligand and a ketone or ester carboxylic compound.

12 Claims, No Drawings

CATALYTIC COPOLYMERIZATION OF CO/OLEFIN WITH KETONE ADDITIVE.

This invention relates to a process for the production of polymers of carbon monoxide and ethylenically unsaturated hydrocarbon and to certain novel catalyst compositions useful in such process.

High molecular weight copolymers or terpolymers of carbon monoxide and one or more ethylenically unsaturated hydrocarbons are often referred to as polyketones. These polymers are linear, alternating polymers of carbon monoxide and at least one olefinic moiety polymerized through the ethylenic unsaturation of the hydrocarbon. For example, when the ethylenically unsaturated hydrocarbon is ethylene, the copolymer consists of units of the formula $-CO-C_2H_4-$. The polyketones are typically prepared by reacting carbon monoxide and the ethylenically unsaturated hydrocarbon(s) in the presence of a Group VIII metal, e.g., palladium, the anion of an non-hydrohalogenic acid having a pKa less than 6 and a bidentate ligand of the formula $R^1R^2-M-R-MR^3R^4$ wherein $R^1$, $R^2$, $R^3$ and $R^4$ are organic radicals, R is a bivalent organic bridging group and M is phosphorus, arsenic or antimony.

For some polymerization applications, the anion catalyst component is usefully provided as the free acid. In other applications the anion is provided as a salt of the acid. However, use of a salt as the source of the desired anion frequently results in a decrease of catalyst activity. When the anion source is the salt of a transition metal, addition of a quinone such as 1,4-benzoquinone results in improved activity. When the salt is a non-transition metal, hydroquinones are not particularly effective. Addition of an ether to a catalyst composition derived from a non-transition metal salt does result in increased activity. However, for some applications an alternative to the use of ethers as catalyst modifier is desired.

SUMMARY OF THE INVENTION

The process of the invention contemplates the formation of linear, alternating polymers by polymerization of carbon monoxide with at least one ethylenically unsaturated hydrocarbon in the presence of a catalyst composition prepared from a palladium compound, a non-transition metal salt of a non-hydrohalogenic acid having a pKa less than 6, a bidentate phosphorus ligand and a ketone or ester carboxylic compound. The invention further contemplates the novel catalyst compositions useful in the process of the invention.

DESCRIPTION OF THE INVENTION

In the process of the invention, carbon monoxide is polymerized with at least one ethylenically unsaturated hydrocarbon. Preferred hydrocarbons are hydrocarbons of 2 to 20 carbon atoms inclusive, more preferably 2 to 10 carbon atoms inclusive. Such hydrocarbons are wholly aliphatic, including α-olefins such as ethylene, propylene, butene-1 and octene-1, or arylaliphatic olefins containing an aryl substituent on a carbon atom of the ethylenic unsaturation such as styrene, p-methylstyrene and p-ethylstyrene. Preferred embodiments of the process of the invention prepare polymers of carbon monoxide and ethylene or terpolymers of carbon monoxide, ethylene and an aliphatic α-olefin, particularly propylene.

The molar ratio of unsaturated hydrocarbon to carbon monoxide in the polymerization mixture varies from about 10:1 to about 1:5, preferably from about 5:1 to about 1:2. When ethylene and a second ethylenically unsaturated hydrocarbon are employed to produce a terpolymer with carbon monoxide, the molar ratio of ethylene to other unsaturated hydrocarbon is preferably from about 400:1 to about 1:1 with ratios from about 100:1 to about 2:1 being preferred.

The palladium compound employed in the novel catalyst composition of the invention is a palladium salt of an organic acid, preferably a carboxylic acid of up to about 10 carbon atoms. In part for ease of procurement, palladium acetate is a particularly preferred source of palladium compound although palladium propionate or palladium hexanoate are also suitable.

The palladium compound is employed in conjunction with certain salts of acids having a pKa less than about 6, preferably less than about 2, as determined in aqueous solution at 18° C. Suitable acids are oxygen-containing acids and are inorganic acids such as sulfuric acid or perchloric acid or are organic acids including carboxylic acids such as trichloroacetic acid, difluoroacetic acid and trifluoroacetic acid, and sulfonic acids such as methanesulfonic acid, trifluoromethanesulfonic acid and para-toluenesulfonic acid. Trifluoroacetic acid and para-toluenesulfonic acid are a preferred class of organic acids. The metal salts of these acids contain a non-transition metal, and particularly a metal or Group IA to Group VA of the Periodic Table of Elements. Illustrative of metals whose salts are useful in the catalyst complexes of the invention are the Group IA metals lithium, sodium and potassium, the Group IIA metals magnesium and calcium, the Group IIIA metals aluminum and gallium, the Group IVA metals tin and lead and the Group VA metal antimony. The Group IA metals constitute a preferred class of the non-transition metals, especially sodium and potassium.

The metal salt, like the palladium compound, is employed in a catalytic amount. For each mole of ethylenically unsaturated compound to be polymerized, from about $1 \times 10^{-7}$ mol to about $1 \times 10^{-3}$ mol of palladium compound is employed, preferably from about $1 \times 10^{-6}$ mol to about $1 \times 10^{-4}$ mol. The metal salt is employed in a quantity from about 0.5 equivalents to about 200 equivalents per gram-atom of palladium (as the compound). Amounts of metal salt from about 1 to about 100 equivalents per gram-atom of palladium are preferred.

The bidentate phosphorus ligand of the invention has the formula

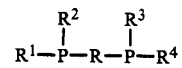

in which $R^1$, $R^2$, $R^3$ and $R^4$ independently are an organic radicals of from 1 to 14 carbon atoms inclusive, but preferably are aryl, alkaryl or alkoxyaryl, such as phenyl, alkylphenyl or alkoxyphenyl groups. Phenyl, para-tolyl and p-methoxyphenyl groups are particularly preferred. The group R is a divalent bridging group of up to 20 carbon atoms, with up to three carbon atoms in the bridge, and is hydrocarbyl or substituted hydrocarbyl wherein any substituent is di($R^1$)P-alkyl. Examples of suitable bidentate ligands are 1,3-bis(di-p-tolylphosphino)propane, 1,3-bis(di-p-methoxyphenylphosphino)propane, 1,3-bis(diphenylphosphino)propane, and 2-methyl-2-(methyldiphenylphosphino)-1,3-bis(diphenylphosphino)propane. The preferred bidentate ligand is 1,3-bis(diphenylphosphino)propane. The ligand is utilized in a quantity from about 0.1 to about 5 mol per mol of palladium compound and preferably from about 0.5 to about 1.5 mol per mol of palladium compound.

The ketone or ester carboxylic compound used as a catalyst component contains from 3 to 20 carbon atoms inclusive, preferably 3 to 10 carbon atoms inclusive, is acyclic or cyclic and is an otherwise hydrocarbyl ester or ketone or is substituted hydrocarbyl with non-hydrocarbyl substituents such as hydroxyl, halo or alkoxy which are inert under polymerization conditions. The ester or ketone carboxylic compounds are aliphatic, aromatic, or mixed aliphatic and aromatic and are mono-functional esters or ketons, e.g., mono-esters, or are difunctional ketones or esters such as diesters of dicarboxylic acids. Examples of suitable ketones are aliphatic ketones such as acetone, methyl ethyl ketone, diethylketone, 2,5-hexanedione, cyclopentanone, cyclooctanone and ketones with an aryl substituent include acetophenone and benzophenone. Illustrative esters include methyl acetate, ethylpropionate, dimethyl carbonate and diethyl oxylate, butyrolactone, ethylene glycol diacetate, propylene glycol diacetate and methyl benzoate. Substituted hydrocarbyl esters and ketones include chloroacetone, methoxydiethylketone, methoxymethyl propionate, and ethylene glycol monoacetate. Also useful are compounds with both ketone and ester moieties such as methyl 3-oxo-hexanoate. Largely for reasons of availability, hydrocarbyl carboxylic compounds, and particularly acetone and ethylene glycol diacetate are prefered.

The ester component is employed in a quantity from about 0.5 mol to about 10,000 mol per mole of metal salt, preferably from about 1 mol to about 5000 mol per mole of metal salt.

The polymerization process of the invention is conducted under polymerization conditions in the presence of an alcohol diluent as a liquid phase. Suitable diluents are alkanols of up to 8 carbon atoms, preferably methanol or ethanol. Useful polymerization temperatures are from about 20° C. to about 200° C. and in particular from about 30° C. to about 150° C. Suitable polymerization pressures vary from about 1 bar to about 200 bar, preferably from about 20 bar to about 100 bar. The method of contacting the reactants and catalyst is not critical and may be accomplished by stirring or shaking. Subsequent to polymerization, the product mixture components are separated and the polymer recovered by conventionl methods such as filtration or decantation. On occasion, the polymer contains catalyst residues which may be removed, if desired, by treatment with a solvent selective for the catalyst residues present.

The invention is illustrated further by the following Illustrative Embodiments and Comparative Experiments. All of the copolymers prepared according to the invention and isolated had melting points of 257° C. and were shown by $^{13}$NMR analysis to have a linear, alternating structure.

COMPARATIVE EXAMPLE I (A) A magnetically-stirred autoclave was charged with 0.1 mmol of palladium acetate, 0.15 mmol of 1,3-bis(diphenylphosphino)propane and 1 mmol of potassium para-tosylate (p-toluenesulfonate) in 50 ml of methanol. Carbon monoxide was introduced until a pressure of 30 bar was reached and ethylene was added until a pressure of 60 bar was reached. The autoclave was heated to 80° C. and maintained at that temperature for 5 hours. The autoclave was then cooled to room temperature and the pressure released. A very small quantity of polymer was obtained.

(B) Essentially the same result was obtained when 1 mmol of lithium p-tosylate was used in place of the potassium p-tosylate.

COMPARATIVE EXAMPLE II

The procedure of the first part of Comparative Example I was repeated with the addition of 10 mmol of 1,4-benzoquinone to the reaction mixture. Again, no more than a trace of polymer was obtained.

ILLUSTRATIVE EMBODIMENT I

The procedure of part A of Comparative Experiment I was repeated with the following differences. The catalyst solution additionally contained 20 ml of ethylene glycol diacetate and the reaction mixture, subsequent to cooling and venting of the reactor, was filtered to remove polymer which was washed with methanol and dried in vacuo at room temperature. The yield of copolymer was 16 grams. Accordingly, the calculated polymerization rate was 320 g of copolymer/g of Pd/hour.

ILLUSTRATIVE EMBODIMENT II

The procedure of Illustrative Embodiment I was repeated, except that 20 ml of acetone was employed in place of the ethylene glycol diacetate. The yield of copolymer was 15 g, produced at the calculated rate of 300 g of copolymer/g Pd/hr.

COMPARATIVE EXAMPLE III

The procedure of Illustrative Embodiment I was repeated except that no ethylene glycol diacetate was employed, 1 mmol of tin sulfate was used in place of the potassium p-tosylate and the reaction time was 1 hour. The yield of copolymer was 5 g, produced at a calculated rate of 500 g of copolymer/g Pd/hr.

COMPARATIVE EXAMPLE IV

The procedure of Comparative Example III was repeated, except that 10 mmol of 1,4-benzoquinone was added to the catalyst solution. The yield of copolymer was 5 grams, produced at a calculated rate of 500 g of copolymer/g Pd/hr.

COMPARATIVE EXAMPLE V

The procedure of Illustrative Embodiment I was repeated, except that no ethylene glycol diacetate was employed. 2 mm of antimony sulfate were used instead of 1 mmol of potassium p-tosylate and the reaction temperature was 55° C. A yield of 17.5 g of copolymer was obtained, produced at a calculated rate of 350 g of copolymer/g Pd/hr.

ILLUSTRATIVE EMBODIMENT III

The procedure of Comparative Example V was repeated except that 20 ml of ethylene glycol diacetate was added to the catalyst solution and the reaction time was 2 hours. The yield of copolymer was 17 g, produced at a calculated rate of 850 g of copolymer/g Pd/hr.

ILLUSTRATIVE EMBODIMENT IV

When the procedures of the above Illustrative Embodiments are repeated in the additional presence of an amount of propylene, a terpolymer of carbon monoxide, ethylene and propylene will be obtained.

The polymers of the invention are known polymers and have good mechanical properties. They are processed by means of the usual techniques into films, sheets, plates, fibers and molded objects, for example. The relatively low molecular weight polymers in particular are used as components in blends with other polymers having applications as waxes or greases as well as having utility as plasticizers for other polymers. The higher molecular weight polymer products find utility as premium thermoplastics for fibers, films, and injection or compression molding applications. Because of their properties, the higher molecular weight polymers are suitable for applications in the auto industry, in the manufacture of containers for food and drinks, as construction and building material and a variety of similar applications. The polymers are modified by mixing or blending with other polymeric materials to produce mixtures or blends having varied and widespread application.

What is claimed is:

1. The process of producing a linear alternating polymer of carbon dioxide and at least one ethylenically unsaturated hydrocarbon of 2 to 20 carbon atoms inclusive, by contacting carbon monoxide and said hydrocarbon under polymerization conditions in the presence of a catalyst composition prepared from a palladium compound, a non-transition metal salt of a non-hydrohalogenic acid having a pKa less than about 6, a bidentate phosphorus ligand of the formula $R^1R^2-P-R-P-R^3R^4$ in which $R^1$, $R^2$, $R^3$ and $R^4$ independently are organic radicals of from 1 to 14 carbon atoms inclusive and R is a divalent bridging group of up to 20 carbon atoms and up to 3 carbon atoms in the bridge, and a ketone of from 3 to 20 carbon atoms inclusive and recovering from the resulting product mixture said linear alternating polymer of carbon monoxide and said hydrocarbon.

2. The process of claim 1 wherein at least one unsaturated hydrocarbon is selected from ethylene or mixtures of ethylene and propylene.

3. The process of claim 2 wherein the unsaturated hydrocarbon is ethylene.

4. The process of claim 2 wherein the metal salt is a non-transition metal salt of an oxygen-containing acid having a pKa less than about 2.

5. The process of claim 4 wherein the metal salt is a salt of a Group IA to Group VA metal.

6. The process of claim 4 wherein each of $R^1$, $R^2$, $R^3$ and $R^4$ of the bidentate ligand is phenyl, alkylphenyl or alkoxyphenyl.

7. The process of claim 4 wherein the ketone is otherwise hydrocarbon of 3 to 10 carbon atoms inclusive.

8. The process of claim 5 wherein the palladium compound is palladium acetate.

9. The process of claim 8 wherein the ketone is acetone.

10. The process of claim 9 wherein the bidentate ligand is 1,3-bis(diphenylphosphino)propane.

11. The process of claim 10 wherein the metal salt is a Group 1A metal salt.

12. The process of claim 11 wherein the Group IA metal salt is potassium para-toluenesulfonate.

* * * * *